US011447267B2

(12) United States Patent
Lin et al.

(10) Patent No.: US 11,447,267 B2
(45) Date of Patent: Sep. 20, 2022

(54) TAKE-OFF APPARATUS AND METHOD FOR UNMANNED AERIAL VEHICLE WITHOUT LANDING GEAR

(71) Applicants: Huan-Jung Lin, Yun-Lin (TW); Chung-Yan Lin, Yun-Lin (TW)

(72) Inventors: Huan-Jung Lin, Yun-Lin (TW); Chung-Yan Lin, Yun-Lin (TW)

(73) Assignee: National Formosa University, Yun-Lin Hsien (TW)

( * ) Notice: Subject to any disclaimer, the term of this patent is extended or adjusted under 35 U.S.C. 154(b) by 489 days.

(21) Appl. No.: 16/680,503

(22) Filed: Nov. 12, 2019

(65) Prior Publication Data

US 2020/0148389 A1    May 14, 2020

(30) Foreign Application Priority Data

Nov. 14, 2018    (TW) .................................. 107140414

(51) Int. Cl.

| B64F 1/10 | (2006.01) |
|---|---|
| B64C 39/02 | (2006.01) |
| B60P 3/11 | (2006.01) |
| G01L 5/13 | (2006.01) |
| G01L 1/04 | (2006.01) |
| G01P 5/16 | (2006.01) |

(52) U.S. Cl.
CPC .................. *B64F 1/10* (2013.01); *B60P 3/11* (2013.01); *B64C 39/024* (2013.01); *G01L 1/04* (2013.01); *G01L 5/133* (2013.01); *G01P 5/16* (2013.01); *B64C 2201/027* (2013.01); *B64C 2201/08* (2013.01); *B64C 2201/141* (2013.01)

(58) Field of Classification Search
CPC . B64F 1/10; B60P 3/11; B64C 39/024; B64C 2201/027; B64C 2201/08; B64C 2201/141; B64C 2201/021; B64C 2201/104; G01L 1/04; G01L 5/133; G01P 5/16

See application file for complete search history.

(56) References Cited

U.S. PATENT DOCUMENTS

| 2017/0036753 A1* | 2/2017 | Shue ........................ B64C 13/04 |
| 2017/0129603 A1* | 5/2017 | Raptopoulos ......... B64C 39/024 |
| 2018/0079531 A1* | 3/2018 | Bennett ................. B64C 39/024 |
| 2020/0079505 A1* | 3/2020 | Stepura ................ G08G 5/0069 |

\* cited by examiner

*Primary Examiner* — Richard M Camby

(57) ABSTRACT

A take-off apparatus and method for unmanned aerial vehicle without landing gear includes an unmanned aerial vehicle, a carrier, a lock/release mechanism, a lift or airspeed sensing module, a signal processing module and a release motion sensing module. The lock/release mechanism locks the unmanned aerial vehicle onto the carrier and controllably releases the unmanned aerial vehicle from the carrier. The lift or airspeed sensing module senses an overall lift or airspeed of the unmanned aerial vehicle. When the lift or speed value of the unmanned aerial vehicle is greater than a predetermined threshold, it drives the lock/release mechanism into an unlocked state so that the unmanned aerial vehicle is released from the carrier and takes off more accurately and successfully.

18 Claims, 6 Drawing Sheets

TAKE-OFF APPARATUS AND METHOD FOR UNMANNED AERIAL VEHICLE WITHOUT LANDING GEAR

FIELD OF INVENTION

The present disclosure relates to a take-off apparatus and method for an unmanned aerial vehicle without a landing gear, and more particularly to an unmanned aerial vehicle take-off control technology capable of controlling and releasing the time point of take-off more accurately to improve the success probability of the take-off of the unmanned aerial vehicle.

BACKGROUND OF INVENTION

Description of the Related Art

From 1994 to 1998, NASA and Aero Vironment's Pathfinder UAV opened the door for researching high altitude and long endurance (HALE) solar drones. Followed by some test flights of Helios from 1999 to 2003, and achieved the world record of non-rocket power flight at the highest altitude of 29524 m and the task of sailing for 40 hours of long endurance. The Zephyr series of light solar drones, recently built by British Qineti Q company, is a part of project of the Airbus High Altitude Pseudo-Satellite (HAPS). Zephyr has a formal long-term flight record for drone flights from July 9 to Jul. 23, 2010, continuing at an altitude of 12 to 18 km and flying for 336 hours and 22 minutes (about 14 days). At present, the Airbus is preparing to mass-produce the Zephyr S and Zephyr T for flying with low-power satellite communication system. It is completely like a satellite capable of autonomously flying at an altitude of about 20 km for a long time, and provides a maximum resolution of image for the width of 400 km and a communication coverage about 1,000 km$^2$.

In addition, the long-spaced unmanned aerial vehicles (UAVs) with smaller scales are worthy of reference for solar UAVs in the following three countries. First of all, it is Atlantik Solar, Switzerland, which took off on 09:32 on the morning of Jul. 14, 2015, and landed safely after 4 days and 3 nights of a total of 81.5 hours and sailed 2,316 kilometers. It is completely autonomously powered by solar powered and autopilot during the flight. Secondly, in July 2016, Russia's DARPA successfully tested the flight of the Sova solar-powered and long-haul drone, which completed a 50-hours flight to a height of 8,850 m. Finally, it is the development of Korea's EAV (Electrical Air Vehicle), which was the project started by the Korea Aerospace Research Institute (KARI) in 2010, and almost developed one EAV in every two years.

Once the HALE unmanned aircraft is launched, it relies on solar cells and can fly for a few days to several months for observing the ground from the air. Its biggest advantage is that it can perform tasks instead of satellites. The stratosphere is the intermediate area between the Earth's atmosphere and the universe. Once the unmanned aircraft can reach the stratosphere, it can be stably in the air without being affected by bad weather. In addition, satellites can only fly over the Korean peninsula several times a day for observation, while HALE unmanned aircraft can observe the places they want to see for 24 hours a day, just like a synchronous satellite. There is also advantages of being cheap. Compared with satellites flying over 500 kilometers above the Earth, the unmanned aircraft is close to the Earth, even with a normal camera, it can take pictures that match the artificial satellite. Compared with the development of the Arirang 3A satellite in Korea with a total investment of 237.3 billion won, the cost of HALE is only 1 billion won. An important application of HALE is to provide communication services. Due to its proximity to the ground, it can build free wireless network services in a wide area. Therefore, the IT companies such as Google and Facebook also value the development and utilization of HALE unmanned aircraft.

The value of a high-attitude long endurance (HALE) solar-powered unmanned aerial vehicle (UAV) resides on that the vehicle can fly in the stratosphere with a sea level of approximately 20 Km for a long period of time such as several days to several months to carry out aeronautical missions similar to the functions of a synchronous satellite, and thus the HALE UAV is also known as a pseudo satellite or a stratosphere satellite. In addition, the manufacturing cost of the HALE UAV (in a scale of tens of million dollars) is just about one-tenths of the satellite (in a scale of billions dollars), and the HALE UAV also has the advantages of saving the cost of launching a rocket and having the capability of landing the vehicle for reuse, so that the HALE UAV will become a star product of the aerospace industry in the future.

In general, a solar unmanned aerial vehicle does not come with a landing gear in order to reduce weight and resistance. The light and thin structure of the unmanned aerial vehicle is not suitable for a catapult take-off, and the unmanned aerial vehicle has to take off by hand-throwing or being carried by another vehicle. Particular for large and mid-sized solar aircrafts exceeding 30 Kg, these aircrafts need to be carried by a motor vehicle for a run-up to establish the required airspeed, so that the wings can generate sufficient lift to offset the weight of the aircraft in order to let go of the aircraft for the take-off.

To overcome the drawbacks including the operation effort and inconvenience of the take-off of the unmanned aerial vehicle by the conventional hand-throwing or vehicle carrying method, related manufacturers have developed a patented technology as disclosed in P.R.C. Pat. Publication No. CN205044614 that can control and unlock an elevator when a predetermined airspeed is reached, so as to detach the unmanned aerial vehicle from the take-off device and allow the unmanned aerial vehicle to enter into a flight path. However, this patented technology just takes the speed into consideration without considering other factors such as the overall lift of the unmanned aerial vehicle and the weight of the unmanned aerial vehicle, so that the time point of take-off cannot be controlled or released accurately, and the success probability of detaching the unmanned aerial vehicle from the take-off device cannot be improved for the take-off, and the take-off and release control of the unmanned aerial vehicle become inconvenience and troublesome.

SUMMARY OF THE INVENTION

Therefore, it is a primary objective of the present invention to provide a take-off apparatus and method for unmanned aerial vehicles without landing gears having the features of simple structure and safe and simple operation, and factors such as the overall lift, airspeed and weight of the unmanned aerial vehicle are taken into consideration to determine the time point of take-off, so that the present invention can control the time point of take-off more accurately to significantly improve the success probability of detaching the unmanned aerial vehicle from a carrier for the take-off.

To achieve the aforementioned and other objectives, the present invention provides a take-off apparatus and method for unmanned aerial vehicles without landing gears, comprising: an unmanned aerial vehicle, a carrier, a lock/release mechanism, a lift or airspeed sensing module, a signal processing module, and a release motion sensing module. The lock/release mechanism is provided for locking the unmanned aerial vehicle onto the carrier and releasing the unmanned aerial vehicle from the locked state of the carrier. The lift or airspeed sensing module is provided for generating a lift sensing signal or an airspeed sensing signal for the overall lift or airspeed of the unmanned aerial vehicle. The signal processing module is provided for processing the lift sensing signal or the airspeed sensing signal to generate a lift value or an airspeed value, and if the lift value or the airspeed value is greater than a predetermined threshold, a control signal for driving the lock/release mechanism into an unlocked state will be issued. The release motion sensing module is provided for sensing the lock/release mechanism driven into the unlocked state to generate a release sensing signal, and after the signal processing module reads and interprets the release sensing signal, a release detach signal is outputted by the signal processing module according to the release sensing signal and transmitted to an autopilot device of the unmanned aerial vehicle, such that the autopilot device is started by the release detach signal and is controlled to perform a corresponding flight operation according to a predetermined flight program, and such that the unmanned aerial vehicle can be detached from the carrier to take-off and fly according to the predetermined flight program.

DESCRIPTION OF THE PREFERRED EMBODIMENTS

Figure 1:
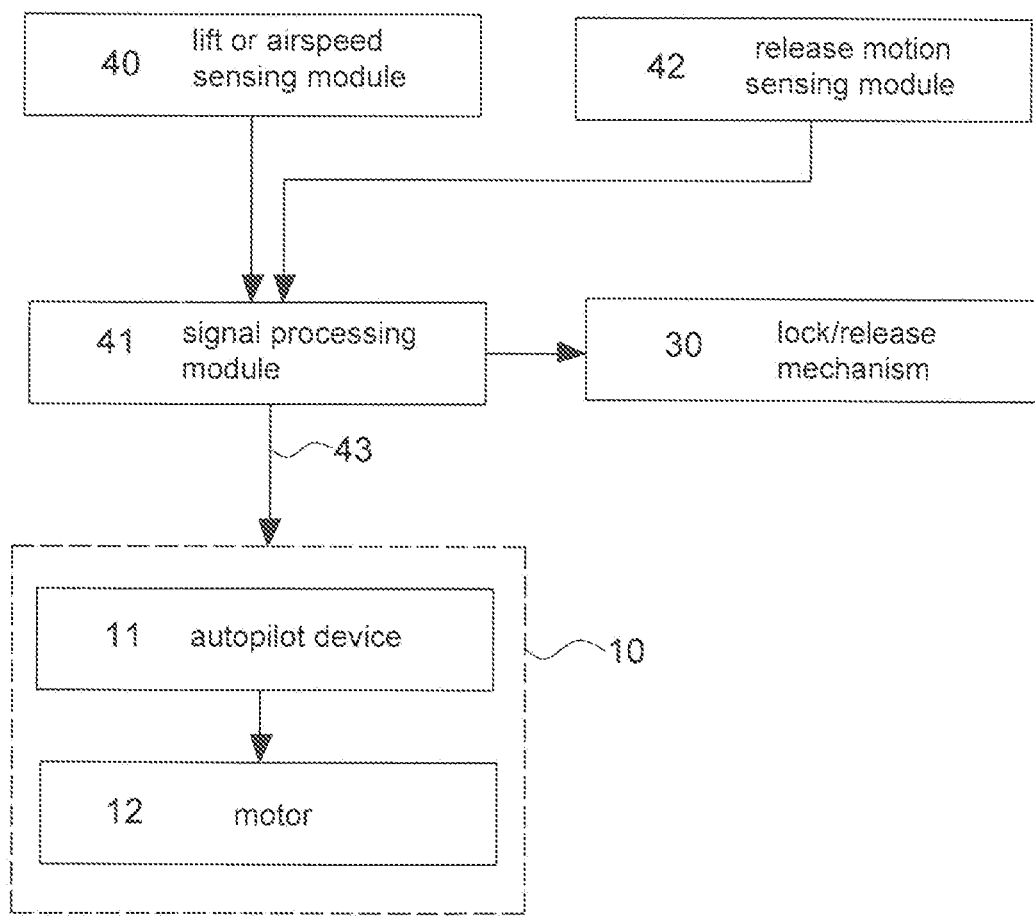
FIG. 1 is a functional block diagram of an embodiment of this disclosure.
Figure 2:
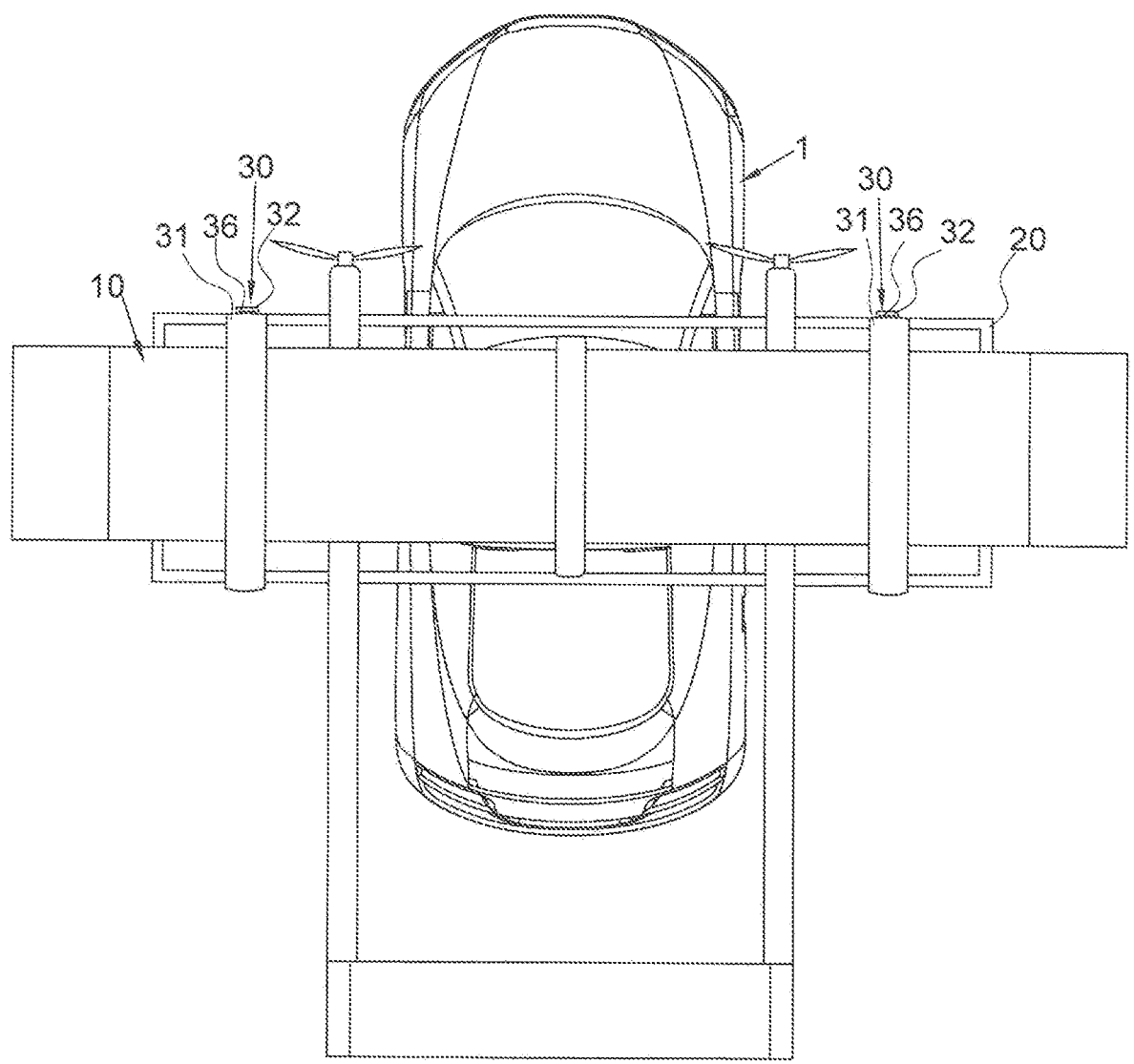
FIG. 2 is a top view of an auxiliary vehicle carrying an unmanned aerial vehicle and preparing for a take-off in accordance with an embodiment of this disclosure.
Figure 3:
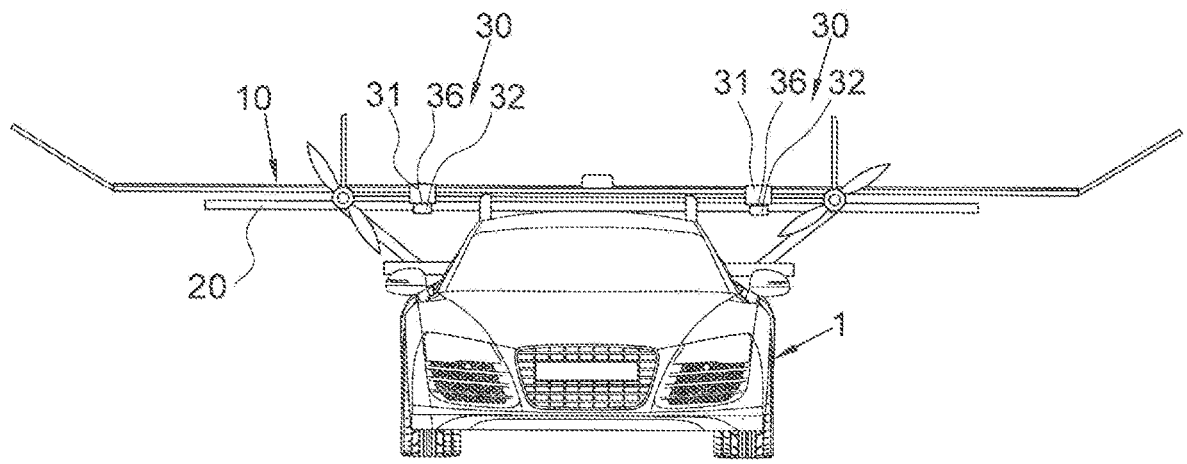
FIG. 3 is a front view of an auxiliary vehicle carrying an unmanned aerial vehicle of and preparing for a take-off in accordance with an embodiment of this disclosure.

With reference to FIGS. 1 to 5 for a take-off apparatus and method for an unmanned aerial vehicle without a landing gear in accordance with an embodiment of this disclosure, the take-off apparatus comprises an unmanned aerial vehicle 10, a carrier 20, at least one lock/release mechanism 30, a lift or airspeed sensing module 40, a signal processing module 41 and a release motion sensing module 42. The unmanned aerial vehicle 10 has an autopilot device 11 for controlling the flight operation of the unmanned aerial vehicle 10 according to a predetermined flight program. The carrier 20 is fixed onto an auxiliary vehicle 1 for carrying the unmanned aerial vehicle 10. While the auxiliary vehicle is traveling in a travel direction with respect to the earth's surface, the unmanned aerial vehicle 10 carried by the carrier 20 is also traveling in the same direction with respect to the earth's surface. The lock/release mechanism 30 is provided for locking the unmanned aerial vehicle 10 onto the carrier 20 and controllably unlocking the unmanned aerial vehicle 10 from a locked state and releasing the unmanned aerial vehicle 10 with respect to the carrier 20. The lift or airspeed sensing module 40 is configured to provide for sensing the overall lift or airspeed of the unmanned aerial vehicle 10 to generate a lift sensing signal or an airspeed sensing signal. The signal processing module 41 is configured to provide for receiving and processing the lift sensing signal to generate a lift value or an airspeed value, and if the lift value or airspeed value is greater than a predetermined threshold, then a control signal for driving the lock/release mechanism 30 into an unlocked state to unlock the unmanned aerial vehicle 10 will be outputted. The release motion sensing module 42 is configured to be provided for sensing the lock/release mechanism 30 when driven into the unlocked state to generate a release sensing signal, and the signal processing module 41 reads and interprets the release sensing signal and then outputs a release detach signal according to the release sensing signal, and then a signal transmission module 43 transmits the release detach signal to the autopilot device 11 so that the autopilot device 11 is started by the release detach signal to performs a corresponding flight operation according to a predetermined flight program, so that the unmanned aerial vehicle 10 can be detached from the carrier 20 for the take-off. In one embodiment, the predetermined threshold of the overall lift of the unmanned aerial vehicle 10 is greater than the weight of the unmanned aerial vehicle 10 by approximately 0.5~5 kgw or greater than the weight of the unmanned aerial vehicle 10 by 1~10% weight of the unmanned aerial vehicle 10. If the release detach signal is generated, the autopilot device 11 will drive a motor 12 of the unmanned aerial vehicle 10 to run at full speed, so that the unmanned aerial vehicle 10 can be detached from the carrier 20 quickly to achieve the take-off and climb successfully.

in FIGS. 2~5, the quantity of the at least one lock/release mechanism is equal to two, and the two lock/release mechanisms are installed on both sides of the carrier 20 and provided for covering both wing positions of the unmanned aerial vehicle 10 respectively. Each lock/release mechanism 30 comprises an elastic band 31, a fastening seat 32, an elastic member 33, a fastening member 34 and a linear actuator 35. The elastic band 31 is provided for wrapping and positioning a body (which is at a wing position) of the unmanned aerial vehicle 10. An end of the elastic band 31 is fixed to a first positon near an end of the carrier 20, and the other end of the elastic band 31 is rotatably pivoted to a fastened member 36. The fastened member 36 has a fastened portion 360. The fastening seat 32 is installed at a second position near an end of the carrier 20. The fastening seat 32 has a vertical hole 321 provided for the fastened member 36 to extend and displace therein, a horizontal hole 320 vertically communicating with the vertical hole 321 and a through hole 322 aligned and communicating with the vertical hole 321. The fastening member 34 is installed at a position of the horizontal hole 320 and elastically pressed by the elastic member 33. The fastening member 34 has a fastening portion 340 for fastening the fastened portion 360. The linear actuator 35 (such as a solenoid valve or an electric screw) installed at the fastening seat 32 comprises a telescopic rod 350 for sheathing and coupling the elastic member 33 to the fastening member 34. If the telescopic rod 350 is situated at a stretched position, the fastening portion 340 will be fastened with the fastened portion 360 to define a locked state. If the telescopic rod 350 is situated at a contracted position, the fastening member 34 will compress the elastic member 33, so that the fastened portion 360 will be detached front the fastening portion 340 to define an unlocked state.

Figure 4:
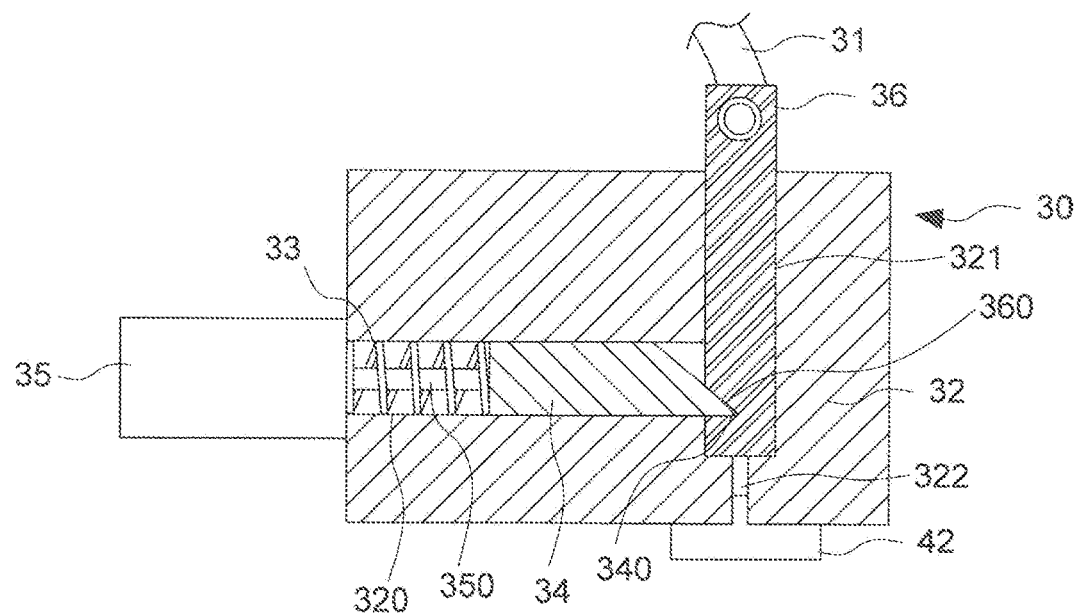
FIG. 4 is a schematic view of a lock/release mechanism situated at a locked state in accordance with an embodiment of this disclosure.
Figure 5:
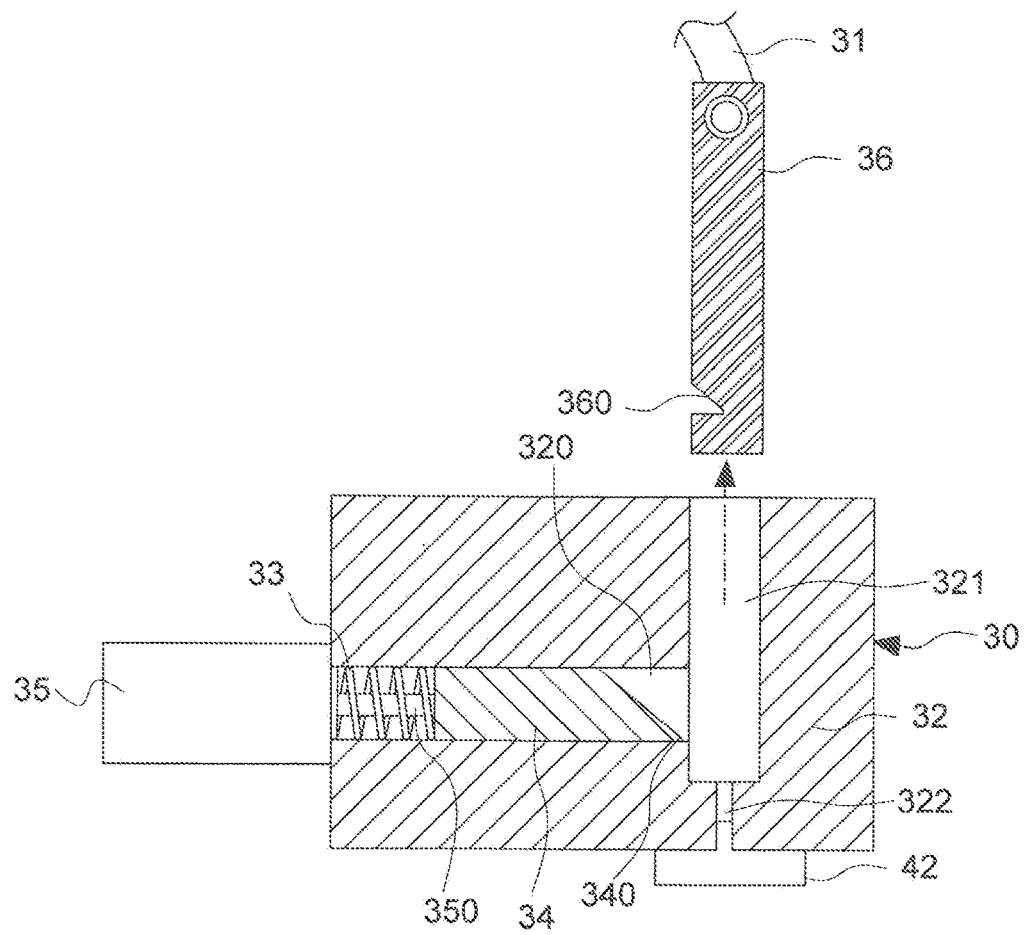
FIG. 5 is a schematic view of a lock/release mechanism situated at an unlocked slate in accordance with an embodiment of this disclosure.

In FIGS. 4 and 5, the release motion sensing module 42 (such as a reflective infrared sensor or a micro switch) senses whether the fastening member 34 is detached from the vertical hole 321 or extended into the vertical hole 321 by a signal reflection or a press contact through the through hole 322. If the fastening member 34 extends into the vertical hole 321, the release motion sensing module 42 will output a high or low potential to the signal processing module 41, and the signal processing module 41 will read and interpret die potential and then drive the telescopic rod 350 of the linear actuator 35 into a stretched position, so that the fastening portion 340 can be fastened with the fastened portion 360 to define the locked state again. On the other hand, if the fastening member 34 is detached from the vertical hole 321, the signal processing module 41 will output a release detach signal to the autopilot device 11.

Figure 6:
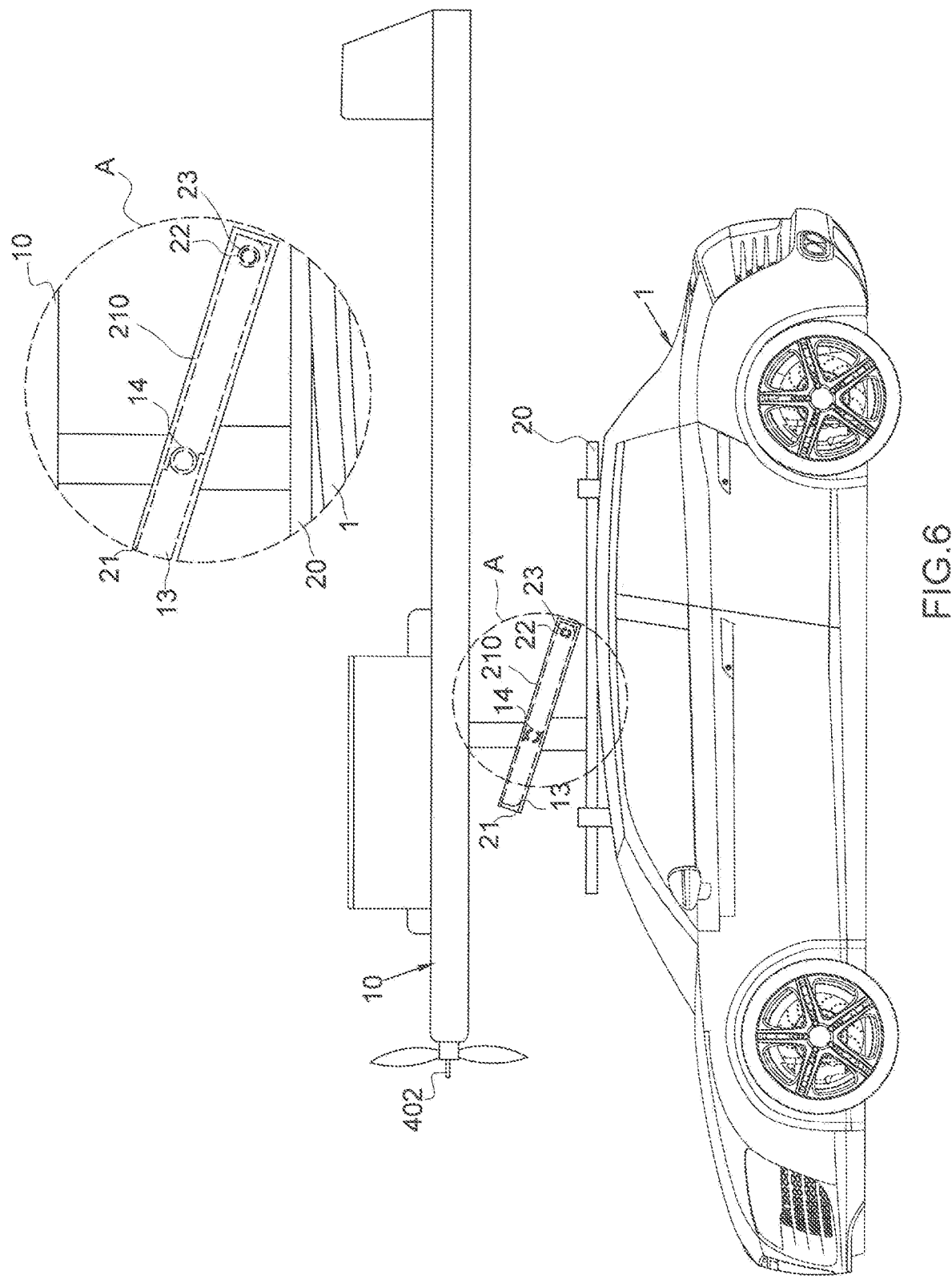
FIG. 6 is a schematic view of an unmanned aerial vehicle situated at a locked state in accordance with an embodiment of this disclosure.
Figure 7:
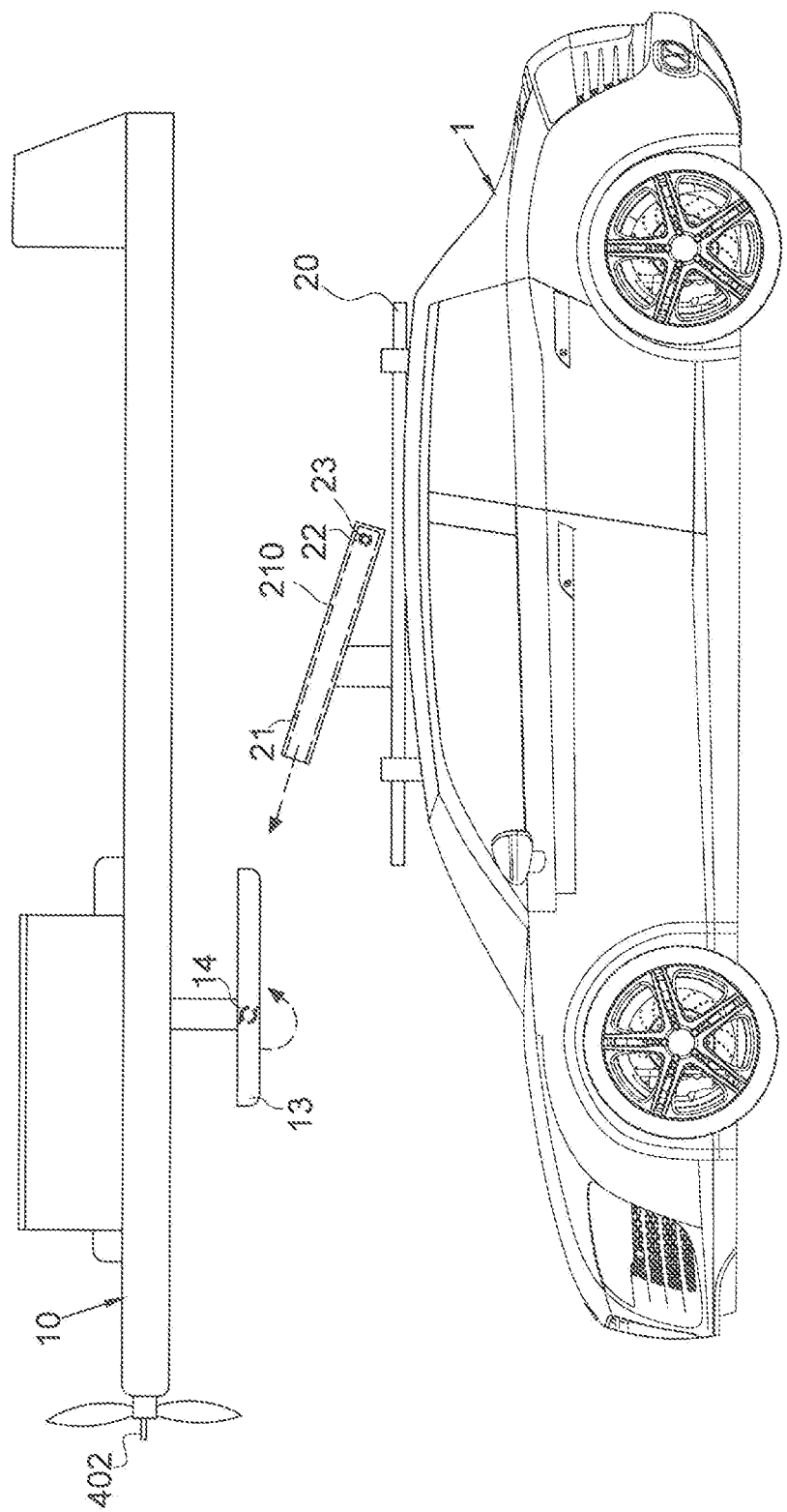
FIG. 7 is a schematic view of an unmanned aerial vehicle situated at a take-off state in accordance with an embodiment of this disclosure.

In FIGS. 6 and 7, the carrier 20 has two guide rails 21 that allow the unmanned aerial vehicle 10 to be detached smoothly from the auxiliary vehicle 1 and moved from the rear side of the auxiliary vehicle 1 and lifted up from the ground gradually. Each of the two guide rails 21 has a front end and a rear end opposite to each other. The front end of the guide rail 21 is nearer to the rear end of the auxiliary vehicle 1 than the rear end of the guide rail 21. The rear end of the guide rail 21 is higher than the front end. The unmanned aerial vehicle 10 has two embedded rails 13 installed thereon. The two embedded rails 13 are embedded into the guide slots 210 of the two guide rails 21 respectively. An included angle of at least 30 degrees is defined between an axial direction of the two guide rails 21 and a horizontal surface. The two guide rails 21 have an engaging member 22 installed thereon. The engaging member 22 is pushed by a first spring 23 to protrude from a middle position of the guide slot 210 of each of the two guide rails 21 to latch the rear end of the embedded rail 13. If the overall lift of the unmanned aerial vehicle 10 overcomes the elastic force of the spring 23 to drive the embedded rail 13 to push away the engaging member 22, the embedded rail 13 will move along the guide slot 210 towards the rear end of the guide rail 21, and finally will separate from the guide rail 21, so that the unmanned aerial vehicle 10 can be detached from the carrier 20. The two embedded rails 13 and the unmanned aerial vehicle 10 are rotatably pivoted to each other within an angle range. When the unmanned aerial vehicle 10 is positioned at the carrier 20 at a normal flight angle and tightened and fixed by the elastic band 31, a first angle is defined between the two embedded rails 13 and the unmanned aerial vehicle 10, so that the two embedded rails 13 can be matched with the angle of inclination of the axis of the guide rail 21 as shown in FIG. 6. When the unmanned aerial vehicle 10 is detached from the guide rail 21, the two embedded rails 13 will be restored to have a second angle with the unmanned aerial vehicle 10 by the elastic force of a second spring 14 as shown in FIG. 7. Wherein, a minimum included angle between the first angle and the horizontal surface is greater than a minimum included angle between the second angle and the horizontal surface.

One of the key factors for the solar unmanned aerial vehicle (UAV) to have long endurance in air is the small power for the level flight of the UAV, so that the power consumption of the UAV flying in air can be minimized, and the endurance in air will become longer for the same power level of the battery, or a smaller battery can further reduce the power of level flight. Theoretically, the power of level flight is related to the weight of the UAV, the lift resistance affected by the aerodynamic characteristics of a fixed-wing UAV, and the efficiency of propulsion system. When the HALE UAV climbs to a cruising attitude, the HALE UAV can perform a level flight mission at a fixed attitude.

During the level flight, the lift L produced by the wings of the UAV just offsets the weight of the UAV mg as following formula (1):

$$mg = C_L \frac{\rho}{2} S v^2$$

Therefore, the velocity v of the level fight can be calculated by the following formula (2):

$$v = \sqrt{\frac{2\,mg}{C_L \rho S}}$$

Where, $C_L$ is the lift of the wing, $\rho$ is the air density that changes with attitude, and S is the wing area. In Formula (2), $C_L$ and $\rho$ are variables, wherein the greater the attitude, the greater the velocity. However, the propulsion system needs to produce a thrust $T_{level}$ to overcome the resistance of the UAV travelling at such level flight velocity. The thrust $T_{level}$ can be calculated by the following formula (3):

$$T_{level} = C_D \frac{\rho}{2} S v^2$$

Where, $C_D$ is the three-dimensional resistance of the UAV. Therefore, the required mechanical power $P_{level}$ produced by the propulsion system is calculated by the following formula (4):

$$P_{level} = T_{level} * v = \frac{C_D}{C_L} 15 \sqrt{\frac{2(mg)^2}{\rho S}}$$

The heavier the UAV (or the stronger the structure), the larger the mechanical power $P_{level}$. The larger the wing area S, the larger the three-dimensional resistance $C_D$. The electric power $P_{level\_elec}$ required to produce such thrust is calculated by the following formula (5):

$$P_{level,elec} = \frac{1}{\eta_{ESC} \cdot \eta_{mot} \cdot \eta_{plr}} P_{level}$$

Where, $\eta_{ESC}$ is the efficiency of the controller of the motor 12, $\eta_{mot}$ is the efficiency of the motor 12, and $\eta_{plr}$ is the efficiency of the propeller. Theoretically, the power of level flight can be obtained accordingly. To reduce the weight of the aircraft, the landing gear may be omitted since the HALE UAV has a smaller number of times of landings, so that $C_D$ in Formula can be reduced and the reduced $C_D$ has the effect of reducing the $P_{level}$ significantly. All these are important techniques for the development of HALE UAV.

Referring to FIGS. 2~5 and 8, in one embodiment of the present invention, the lock/release mechanism 30 is applied for mounting the unmanned aerial vehicle 10 onto the carrier 20, and the lift or airspeed sensing module 40 includes a digital push-pull gauge 400 which is provided for detecting the increasing pull force of the elastic band 31 while the unmanned aerial vehicle 10 has a lift to pull the elastic band 31. A second fastened member 36a is connected to one end of the elastic band 31 and movably received in a receiving hole 321a of a second fastening seat 32a which is provided on the carrier 20, and the second fastened member 36a is connected to the digital push-pull gauge 400 through a connecting member 401 of the digital push-pull gauge 400. The digital push-pull gauge 400 is mounted on an outside of the second fastening seat 32a. The outside of the second fastening seat 32a communicates with the receiving hole 321a through a channel 322a. A distal end of the connecting member 401 extends to the receiving hole 321a and to connect with the second fastened member 36a through the channel 322a. The channel 322a has an inner diameter which is smaller than an inner diameter of the receiving hole 321a. When the auxiliary vehicle 1 accelerates to drive the wings of the UAV to produce a lift to pull the elastic band 31, so that the digital push-pull gauge 400 is further pulled by the elastic band 31 so as to detect the increasing pull force of the elastic band 31 as a corresponding overall lift, and when the corresponding overall lift is greater than the weight of the UAV by 0.5~5 kgw or by 1~10% weight of the UAV, the UAV is unlocked by the lock/release mechanism 30 and is released from the carrier 20 while a release detach signal is generated and transmitted to start the autopilot device 11 of the unmanned aerial vehicle 10 for the take-off of the unmanned aerial vehicle 10, the autopilot device 11 drives the motor 12 to run at full speed firstly and drop the elevator of the unmanned aerial vehicle 10 all the way to the bottom, so that the unmanned aerial vehicle 10 can produce an angle of elevation climb to reach a cruising attitude quickly in order to carry out its missions of flight. The Referring to FIGS. 3 to 7, in another embodiment of the present invention, the lock/release mechanism 30 is applied for mounting the unmanned aerial vehicle 10 onto the carrier 20, and the lift or airspeed sensing module 40 includes an airspeed tube 402 which is mounted on the unmanned aerial vehicle 10 and is provided for detecting an airspeed of the unmanned aerial vehicle 10 while the unmanned aerial vehicle 10 has a motion carried by the auxiliary vehicle 1, the airspeed is a parameter for calculating a corresponding lift of the unmanned aerial vehicle 10, so that when the auxiliary vehicle 1 accelerates to drive the UAV to produce an airspeed calculated as a corresponding overall lift which is greater than the weight of the UAV by 0.5~5 kgw or by 1~10% weight of the UAV, the UAV is unlocked by the lock/release mechanism 30 and is released from the carrier 20 while a release detach signal is generated and transmitted to start the autopilot device 11 of the unmanned aerial vehicle 10 for the take-off of the unmanned aerial vehicle 10, the autopilot device 11 drives the motor 12 to run at full speed firstly and drop the elevator of the unmanned aerial vehicle 10 all the way to the bottom, so that the unmanned aerial vehicle 10 can produce an angle of elevation climb to reach a cruising attitude quickly in order to carry out its missions of flight.

Figure 8:
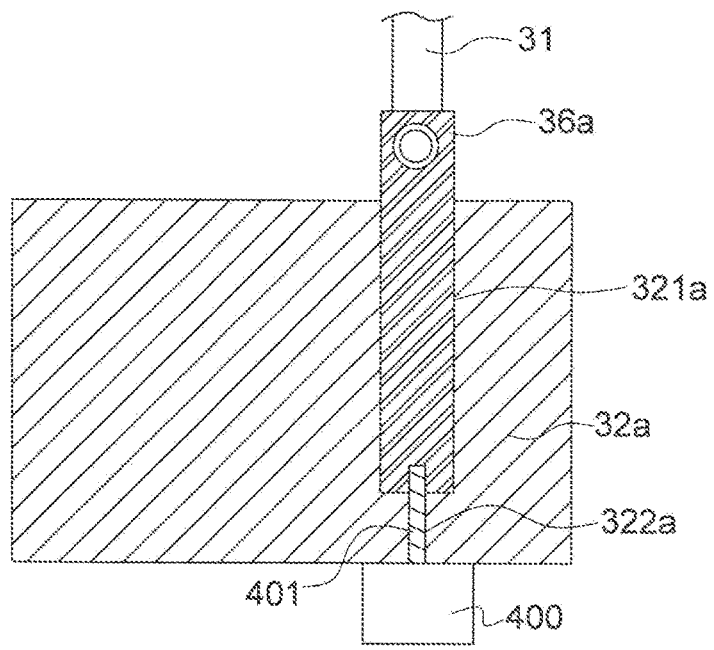
FIG. 8 is a schematic view showing one embodiment of the lift or airspeed sensing module including a digital push-pull gauge in accordance with this disclosure.

The settings of parameters and the references for calculation of the present invention are listed in Table 1 below. FIG. 8 shows the flight data analysis of the take-off of the unmanned aerial vehicle 10 carried by the auxiliary vehicle 1 of this disclosure.

TABLE 1

| Parameter (Unit) | Parameter Value | Remarks |
|---|---|---|
| CL | 1 | Lift coefficient of aircraft |
| $\rho$ (kg/m$^3$) | 1.29 | Air density on the ground |
| S (m$^2$) | 5 | 10 m (wingspan) * 0.5 m (chord length) is equal to wing area. |
| V (m/s) | 9.17 | Airspeed is about 33 km/hr |
| Lift L (kgw) | 27.7 | Greater than the weight of aircraft of 27.6 kgw |

Therefore, this disclosure has the following features: 1. This disclosure can control the time point of take-off to release the aircraft accurately and effectively; 2. This disclosure can minimize the possibility of damaging the surface and structure of the unmanned aerial vehicle while the unmanned aerial vehicle is locked, released or takes off; 3. The carrier of this disclosure carrier has a large wing support area, so that the posture of the aircraft can be fixed effectively before the take-off; 4. The separated design of the carrier and the release mechanism of this disclosure not just provides a simple structure only, but also provides a simple operation; 5. The lock/release mechanism of this disclosure can detect the overall lift or airspeed to determine the release time of the unmanned aerial vehicle; and 6. The lock/release mechanism of this disclosure can generate a release detach signal to the automatic assisted driving device, so that the autopilot device can be controlled to run at full speed.

What is claimed is:

1. A take-off apparatus for unmanned aerial vehicle without landing gear, comprising:
    an unmanned aerial vehicle, having an autopilot device for controlling a flight operation of the unmanned aerial vehicle;
    a carrier, fixed onto an auxiliary vehicle, for carrying the unmanned aerial vehicle, such that when the auxiliary vehicle is traveling in a traveling direction with respect to the earth's surface, the carrier carries the unmanned aerial vehicle to travel in the traveling direction with respect to the earth's surface;
    at least one lock/release mechanism, for locking the unmanned aerial vehicle onto the carrier in a locked state and controllably unlocking and releasing the unmanned aerial vehicle with respect to the carrier;
    a lift or airspeed sensing module configured to sense the overall lift or airspeed of the unmanned aerial vehicle carried by the auxiliary vehicle to generate a lift sensing signal or an airspeed sensing signal;
    a signal processing module configured to receive and process the lift sensing signal or the airspeed sensing signal to generate a lift value or an airspeed value, such that if the lift value or the airspeed value is greater than a predetermined threshold, then a control signal configured to drive the at least one lock/release mechanism into an unlocked state is issued, and such that the at least one lock/release mechanism unlocks and releases the unmanned aerial vehicle with respect to the carrier;
    a release motion sensing module configured to sense the at least one lock/release mechanism driven into the unlocked state to generate a release sensing signal, and the signal processing module outputting a release detach signal according to the release sensing signal, and a signal transmission module configured to transmit the release detach signal to the autopilot device and the autopilot device being started by the release detach signal and being controlled to perform a corresponding flight operation according to a predetermined flight program, so that the unmanned aerial vehicle can be detached from the carrier to take-off and fly according to the predetermined flight program.

2. The take-off apparatus for unmanned aerial vehicle without landing gear as claimed in claim 1, wherein the predetermined threshold of the overall lift of the unmanned aerial vehicle is greater than the weight of the unmanned aerial vehicle by approximately 0.5~5 kgw by 1~10% weight of the unmanned aerial vehicle.

3. The take-off apparatus for unmanned aerial vehicle without landing gear as claimed in claim 1, wherein if the release detach signal is generated, the autopilot device will drive a motor of the unmanned aerial vehicle running at: full speed, so that the overall lift of the unmanned aerial vehicle is greater than the weight of the unmanned aerial vehicle, and the unmanned aerial vehicle is detached from the carrier to take-off.

4. The take-off apparatus for unmanned aerial vehicle without landing gear as claimed in claim 1, wherein there two lock/release mechanisms, and each lock/release mechanism comprises:

an elastic band, for wrapping a body of the unmanned aerial vehicle, and an end of the elastic band being fixed to a first position near an end of the carrier, and the other end of the elastic band being rotatably pivoted to a fastened member, and the fastened member having a fastened portion; a fastening seat, disposed at a second position near the other end of the carrier, and having a vertical hole provided for the fastened member to extend and displace therein, a horizontal hole communicating with the vertical hole, and a through hole aligned precisely and communicating with the vertical hole;

an elastic member;

a fastening member, disposed in the horizontal hole, and having a fastening portion for fastening the fastened portion; and a linear actuator, disposed at the fastening seat, and comprising a telescopic rod provided for the elastic member to sheath and couple the fastening member; wherein if the telescopic rod is situated at a stretched position, the fastening portion of the fastening member will be fastened with the fastened portion of the fastened member to define as the locked state; if the telescopic rod is situated at a contracted position, the fastening member will compress the elastic member to separate the fastened portion from the fastening portion to define as the unlocked state.

5. The take-off apparatus for unmanned aerial vehicle without landing gear as claimed in claim 4, wherein the carrier has two guide rails installed thereon; the two guide rails have a front end and a rear end opposite to each other, and the front end of the two guide rails is nearer to a rear end of the auxiliary vehicle than the rear end of the two guide rails; the rear end of the two guide rails is higher than front end of the two guide rails; the unmanned aerial vehicle has two embedded rails installed thereon; the two embedded rails are embedded into the guide slots of the two guide rails respectively; an included angle of at least 30 degrees is defined between the axial direction of the two guide rails and a horizontal surface; the two guide rails have an engaging member installed thereon separately, and the engaging member is pushed by a first spring to protrude from a middle position of the guide slot of the two guide rails to latch a rear end of the embedded rail; if tire overall lift of the unmanned aerial vehicle overcomes the elastic force of the first spring to drive the embedded rail to push away the engaging member, the embedded rail will move along the guide slot towards the rear end of the guide rail and finally detaches from the guide rail, so that the unmanned aerial vehicle can be detached from the carrier.

6. The take-off apparatus for unmanned aerial vehicle without landing gear as claimed in claim 5, wherein the two embedded rails and the unmanned aerial vehicle can be rotatably pivoted to each other within an angle range; when the unmanned aerial vehicle is positioned at the carrier with a normal flight angle and tightened and fixed by the elastic band, a first angle is defined between the two embedded rails and the unmanned aerial vehicle, and the two embedded rails will be matched with the angle of inclination of the axis of the guide rails; when the unmanned aerial vehicle is detached from the guide rail, the two embedded rails will be restored by the elastic force of a second spring to have a second angle with respect to the unmanned aerial vehicle, and; a minimum included angle defined between the first angle and the horizontal surface is greater than a minimum included angle defined between the second angle and the horizontal surface.

7. The take-off apparatus for unmanned aerial vehicle without landing gear as claimed in claim 4, wherein the lift or airspeed sensing module includes a digital push-pull gauge which is configured to detect an increasing pull force of the elastic band to be the lift sensing signal while the unmanned aerial vehicle has a lift to pull the elastic band.

8. The take-off apparatus for unmanned aerial vehicle without landing gear as claimed in claim 7, wherein a second fastened member is connected to one end of the elastic band and movably received in a receiving hole of a second fastening seat which is provided on the carrier; the second fastened member is connected to the digital push-pull gauge through a connecting member of the digital push-pull gauge; the digital push-pull gauge is mounted on an outside of the second fastening seat; the outside of the second fastening seat communicates with the receiving hole through a channel; a distal end of the connecting member extends to the receiving hole to connect with the second fastened member through the channel.

9. The take-off apparatus for unmanned aerial vehicle without landing gear as claimed in claim 8, wherein the channel has an inner diameter which is smaller than an inner diameter of the receiving hole.

10. The take-off apparatus for unmanned aerial vehicle without landing gear as claimed in claim 1, wherein the lift or airspeed sensing module includes an airspeed tube which is mounted on the unmanned aerial vehicle and is provided for detecting an airspeed of the unmanned aerial vehicle to be the airspeed sensing signal while the unmanned aerial vehicle has a motion carried by the auxiliary vehicle.

11. A take-off method for unmanned aerial vehicle without landing gear by the apparatus as claimed in claim 1, comprising the steps of:

providing the apparatus as claimed in claim 1 which comprises the unmanned aerial vehicle, the carrier, the at least one lock/release mechanism, the lift or airspeed sensing module, the signal processing module, the release motion sensing module and the signal transmission module;

using the carrier to carry the unmanned aerial vehicle;

using the at least one lock/release mechanism to lock the unmanned aerial vehicle onto the carrier, and controllably release the unmanned aerial vehicle from a locked state of the carrier;

using the lift or airspeed sensing module to sense the overall lift or airspeed of the unmanned aerial vehicle to generate a lift sensing signal or an airspeed sensing signal;

using the signal processing module to receive and process the lilt sensing signal or the airspeed sensing signal to generate a lift value or an airspeed value, and if the lift value or the airspeed value is greater than a predetermined threshold, then a control signal for driving the lock/release mechanism into an unlocked state will be outputted, such that the at least one lock/release mechanism unlocks and releases the unmanned aerial vehicle with respect to the carrier; and using the release motion sensing module to sense the lock/release mechanism driven into the unlocked state to generate a release sensing signal, and the signal processing module generating a release detach signal according to the release sensing signal, and then the signal transmission module transmitting the release detach signal to the autopilot device to control the autopilot device to perform the corresponding flight operation, so that the unmanned aerial vehicle can be detached form the carrier for the take-off.

12. The method as claimed in claim 11, wherein the predetermined threshold of the overall lift of the unmanned aerial vehicle is greater than the weight of the unmanned aerial vehicle by approximately 0.5~5 kgw.

13. The method as claimed in claim 11, wherein if the release detach signal is generated, the autopilot device will drive a power motor of the unmanned aerial vehicle to run at full speed, so that the unmanned aerial vehicle is detached from the carrier for the take-off.

14. The method as claimed in claim 11, wherein there are two lock/release mechanisms, and each lock/release mechanism comprises:

an elastic band, for wrapping a body of the unmanned aerial vehicle, and an end of the elastic band being fixed to a first position near an end of the carrier, and the other end of the elastic band being rotatably pivoted to a fastened member, and the fastened member having a fastened portion; a fastening seat, disposed at a second position near the other end of the carrier, and having a vertical hole provided for the fastened member to extend and displace therein, a horizontal hole communicating with the vertical hole, and a through hole aligned precisely and communicating with the vertical hole:

an elastic member;

a fastening member, disposed in the horizontal hole, and having a fastening portion for fastening the fastened portion; and a linear actuator, disposed at the fastening seat, and comprising a telescopic rod provided for the elastic member to sheath and couple the fastening member; wherein if the telescopic rod is situated at a stretched position, the fastening portion of the fastening member will be fastened with the fastened portion of the fastened member to define a locked state; if the telescopic rod is situated at a contracted position, the fastening member will compress the elastic member to separate the fastened portion from the fastening portion to define an unlocked state.

15. The method as claimed in claim 14, wherein the carrier has two guide rails installed thereon; the two guide rails have a front end and a rear end opposite to each other, and the front end of the two guide rails is nearer to a rear end of the auxiliary vehicle than the rear end of the two guide rails; the rear end of the two guide rails is higher than front end of the two guide rails; the unmanned aerial vehicle has two embedded rails installed thereon: the two embedded rails are embedded into the guide slots of the two guide rails respectively; an included angle of at least 30 degrees is defined between the axial direction of the two guide rails and a horizontal surface; the two guide rails have an engaging member installed thereon separately, and the engaging member is pushed by a first spring to protrude from a middle position of the guide slot of the two guide rails to latch a rear end of the embedded rail; if the overall aircraft lift of the unmanned aerial vehicle overcomes the elastic force of the spring to drive the embedded rail to push away the engaging member, the embedded rail will move along the guide slot towards the rear end of the guide rail and finally detaches from the guide rail, so that the unmanned aerial vehicle can be detached from the carrier.

16. The method claimed in claim 15, wherein the two embedded rails and the unmanned aerial vehicle can be rotatably pivoted to each other within an angle range; when the unmanned aerial vehicle is positioned at the carrier with a normal flight angle and tightened and fixed by the elastic band, a first angle is defined between the two embedded rails and the unmanned aerial vehicle, and the two embedded rails will be matched with the angle of inclination of the axis of the guide rails; when the unmanned aerial vehicle is detached from the guide rail, the two embedded rails will be restored by the elastic force of a second spring to have a second angle with respect to the unmanned aerial vehicle, and; a minimum included angle defined between the first angle and the horizontal surface is greater than a minimum included angle defined between the second angle and the horizontal surface.

17. The method claimed in claim 14, wherein the lift, or airspeed sensing module includes a digital push-pull gauge which is configured to detect an increasing pull force of the elastic band to be the lift sensing signal while the unmanned aerial vehicle has a lift to pull the elastic band.

18. The method claimed in claim 11, wherein the lift or airspeed sensing module includes an airspeed tube which is mounted on the unmanned aerial vehicle and is provided for detecting an airspeed of the unmanned aerial vehicle to be the airspeed sensing signal while the unmanned aerial vehicle has a motion carried by the auxiliary vehicle.

\* \* \* \* \*